(12) United States Patent
Jahier

(10) Patent No.: US 7,819,090 B2
(45) Date of Patent: Oct. 26, 2010

(54) HEAT EXCHANGE APPARATUS, PARTICULARLY FIRE TUBE CONDENSING BOILER

(75) Inventor: Giovanni Jahier, Mantova (IT)

(73) Assignee: Unical AG S.p.A., Castel D'Ario (IT)

( * ) Notice: Subject to any disclaimer, the term of this patent is extended or adjusted under 35 U.S.C. 154(b) by 317 days.

(21) Appl. No.: 11/887,647

(22) PCT Filed: Apr. 12, 2006

(86) PCT No.: PCT/EP2006/003383

§ 371 (c)(1),
(2), (4) Date: Oct. 1, 2007

(87) PCT Pub. No.: WO2006/111317

PCT Pub. Date: Oct. 26, 2006

(65) Prior Publication Data

US 2009/0050296 A1      Feb. 26, 2009

(30) Foreign Application Priority Data

Apr. 18, 2005  (IT) .................. MN2005A0024

(51) Int. Cl.
*F22B 9/04* (2006.01)
(52) U.S. Cl. ..................... 122/31.1; 122/121
(58) Field of Classification Search ........... 122/31.1, 122/31.2, 32, 33, 44.1, 114, 116, 119, 121, 122/509; 165/104.19
See application file for complete search history.

(56) References Cited

U.S. PATENT DOCUMENTS

| | | | | |
|---|---|---|---|---|
| 324,188 A | * | 8/1885 | Thode | 122/37 |
| 1,332,010 A | * | 2/1920 | Wallace et al. | 165/201 |
| 1,355,686 A | * | 10/1920 | Otis | 122/126 |
| 1,934,496 A | * | 11/1933 | Glisson | 165/299 |
| 1,986,914 A | * | 1/1935 | Avery | 122/149 |
| 4,530,347 A | * | 7/1985 | Baker et al. | 126/355.1 |
| 4,582,043 A | * | 4/1986 | Walker et al. | 126/101 |
| 2008/0240692 A1 | * | 10/2008 | Eberle | 392/449 |

FOREIGN PATENT DOCUMENTS

| EP | 1 004 833 A | 5/2000 |
|---|---|---|
| EP | 1 207 358 A | 5/2002 |

* cited by examiner

*Primary Examiner*—Gregory A Wilson
(74) *Attorney, Agent, or Firm*—Modiano & Associati; Albert Josif; Daniel J. O'Byrne

(57) ABSTRACT

A heat exchange apparatus, particularly a fire tube condensing boiler, provided with a structure made of carbon steel and comprising an outer enclosure, which is adapted to delimit a portion of space for containing the fluid to be heated, which is fed cold by means of an intake coupling located proximate to the base and flows out hot through a discharge coupling located proximate to the top of the enclosure, said portion of space being crossed by flue gas conveyance tubes, further comprising a bell-shaped element, which is located proximate to the top of said portion of space and is open at the lower end and closed at the upper end, said bell-shaped element being provided with a thermostatic device which is adapted to allow the fluid contained therein to flow out when it reaches a preset temperature.

3 Claims, 2 Drawing Sheets

HEAT EXCHANGE APPARATUS, PARTICULARLY FIRE TUBE CONDENSING BOILER

The present invention relates to a heat exchange apparatus, particularly a fire tube condensing boiler.

BACKGROUND OF THE INVENTION

It is known that fire tube condensing boilers have become widespread; they have a structure which comprises an outer enclosure, which is adapted to limit a portion of space designed to contain the water to be heated, which is fed cold by means of an intake coupling located at the base and flows out hot through a discharge coupling located proximate to the top of such enclosure.

The enclosure contains, in a raised position, the furnace where the combustion takes place, and tubes branch out from such furnace and are designed to convey the flue gases which transfer heat to the water to be heated before they are sent to the stack; such tubes can equally be oriented vertically or subvertically, i.e., with a certain inclination.

All the described components are advantageously made of carbon steel, which differently from what occurs for stainless steel ensures an easy procedure for joining the various components by welding; but in this way, such components are subjected to the danger of corrosion by the condensation which, since this is a condensing boiler, is generated in the flue gases as a consequence of the condensation of the water vapor contained in the flue gases.

It is further necessary to consider the presence of other heat exchange devices, such as economizers, which comprise vertical or subvertical flue gas conveyance tubes which are connected in an upward region to a tube plate made of carbon steel.

A co-pending patent application by the same Applicant is related to protection against the danger of corrosion of the flue gas conveyance tubes.

SUMMARY OF THE INVENTION

The aim of the present invention is to provide a heat exchange apparatus in which the furnace, in the case of a boiler, or the upper tube plate, in the case of other types, is also protected against the risk of corrosion by the condensation generated in the flue gases as a consequence of the condensation of the water vapor contained in such flue gases.

The proposed aim is achieved by a heat exchange apparatus, particularly a fire tube condensing boiler, provided with a structure made of carbon steel and comprising an outer enclosure, which is adapted to delimit a portion of space for containing the fluid to be heated, which is fed cold by means of an intake coupling located proximate to the base and flows out hot through a discharge coupling located proximate to the top of the enclosure, said portion of space being crossed by flue gas conveyance tubes, characterized by a bell-shaped element, which is located proximate to the top of said portion of space and is open at the lower end and closed at the upper end, said bell-shaped element being provided with a thermostatic device which is adapted to allow the fluid contained therein to flow out when it reaches a preset temperature.

BRIEF DESCRIPTION OF THE DRAWINGS

Further characteristics and advantages will become better apparent from the description of two preferred but not exclusive embodiments of the invention, both related to a fire tube condensing boiler, which are illustrated by way of non-limiting example in the accompanying drawings, wherein.

DESCRIPTION OF THE PREFERRED EMBODIMENTS

Figure 1:
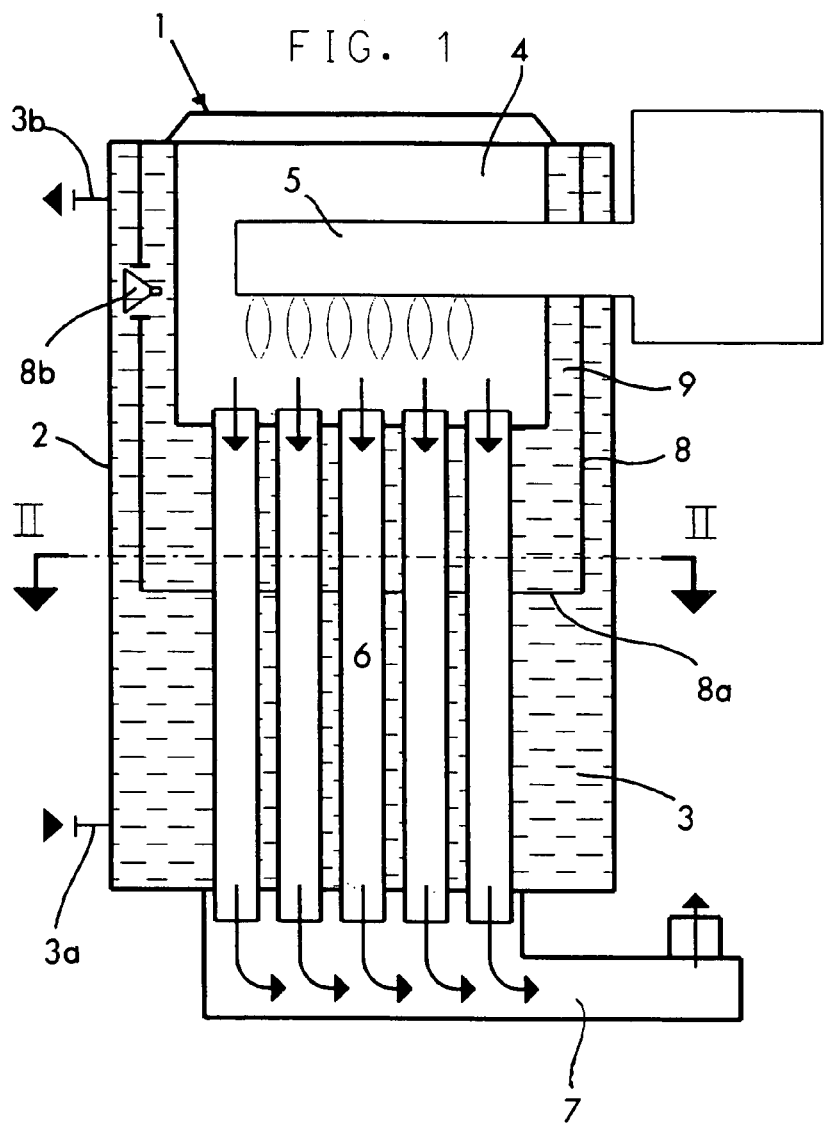
FIG. 1 is a sectional view of the boiler, taken along the line I-I of FIG. 2.
Figure 2:
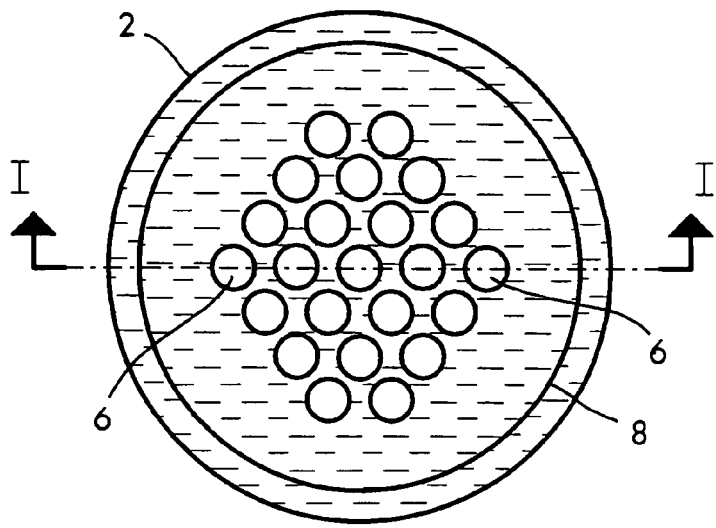
FIG. 2 is a sectional view, taken along the line II-II of FIG. 1.

With reference to FIGS. 1 and 2, the reference numeral 1 generally designates a boiler which comprises an outer enclosure 2, which is adapted to delimit a portion of space 3 for containing water to be heated, which is fed cold by means of an intake coupling 3a located proximate to the base and flows out hot by means of a discharge coupling 3b located proximate to the top.

Moreover, the reference numeral 4 designates a furnace where the combustion generated by a burner 5 occurs, and the reference numeral 6 designates tubes designed to convey the flue gases in output from the furnace 4 to a chamber 7 for accessing the stack.

All this occurs in a known manner.

An important characteristic of the invention is the presence of a bell-shaped element 8, which is located at the peripheral region of the furnace 4, is open at its lower end 8a and is closed at its upper end, so as to delimit an interspace 9 which is filled with the water to be heated; said bell-shaped element is provided with a thermostatic device, such as a valve 8b, which is adapted to allow the water to flow out of the interspace 9 only when it reaches the preset temperature that allows the accumulation, around the furnace, of a mass of water which is hot enough to prevent the condensation, on the wall of said furnace, of the water vapor contained in the flue gases.

Protection of the furnace of the boiler against the risk of corrosion due to the formation of condensation is thus provided.

Figure 3:
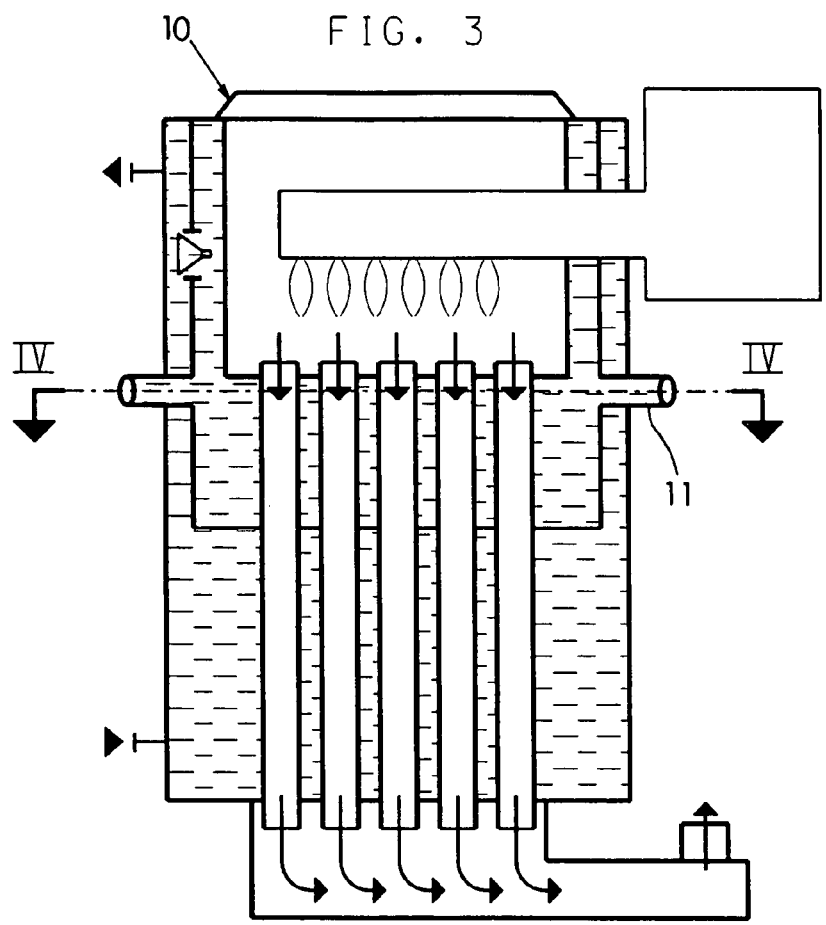
FIG. 3 is a sectional view, taken along the line III-III of FIG. 4.
Figure 4:
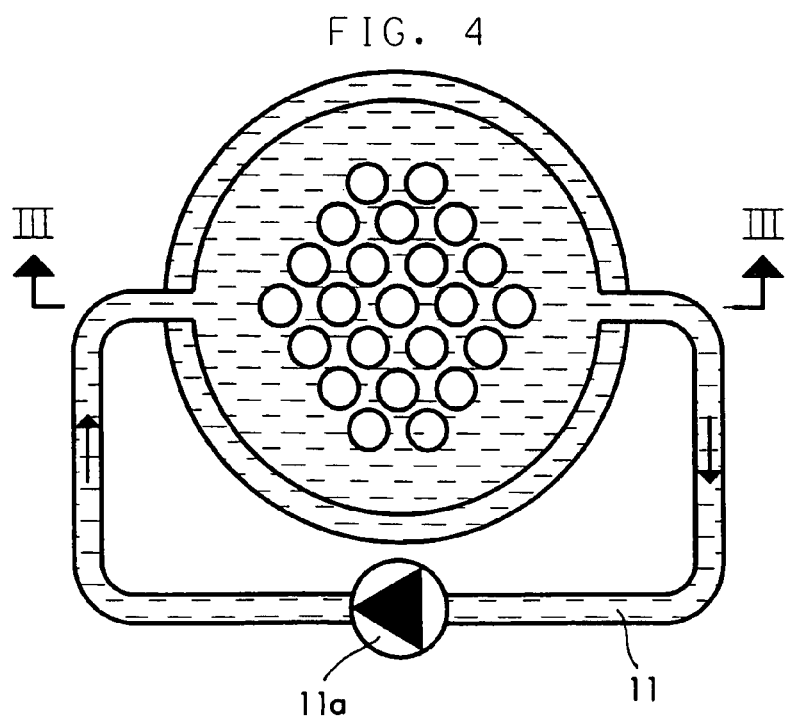
FIG. 4 is a sectional view, taken along the line IV-IV of FIG. 3.

FIGS. 3 and 4 illustrate a constructive variation of a boiler 10, which fully duplicates the characteristics of the boiler 1 described above but adds a recirculation line 11, with a corresponding circulating pump 11a, for the water contained within the bell-shaped element, preferably at the level of the tube plate that lies at the base of the furnace, so as to avoid harmful stratifications thereof.

The described invention is susceptible of numerous other modifications and variations, all of which are within the scope of the appended claims: thus, for example, the thermostatic valve 8b can be provided in any manner and can be replaced with any other equivalent device.

The disclosures in Italian Patent Application No. MN2005A000024 from which this application claims priority are incorporated herein by reference.

What is claimed is:

1. A heat exchange apparatus, particularly a fire tube condensing boiler, provided with a structure made of carbon steel and comprising an outer enclosure, which is adapted to delimit a portion of space for containing a fluid to be heated, which is fed cold by means of an intake coupling located proximate to the base and flows out hot through a discharge coupling located proximate to the top of the enclosure, said portion of space being crossed by flue gas conveyance tubes that are connected at a lower end of a furnace that accommodates a burner, further comprising a bell-shaped element, which is located proximate to the top of said portion of space and is open at the lower end and closed at the upper end, said bell-shaped element being provided with a thermostatic device which is adapted to allow the fluid contained therein to flow out when it reaches a preset temperature, said bell-shaped element enclosing said furnace that accommodates said burner.

2. The apparatus according to claim 1, wherein the thermostatic device is associated with the wall of the bell-shaped element in a raised position.

3. The apparatus according to claim 1, comprising a line for recirculating the fluid contained within the bell-shaped element.

* * * * *